(12) United States Patent
Dufner

(10) Patent No.: US 7,063,525 B2
(45) Date of Patent: Jun. 20, 2006

(54) EXTRUSION DIE

(75) Inventor: Manfred Dufner, Krauchenwies (DE)

(73) Assignee: Klöckner Desma Elastomertechnik GmbH, Fridingen/Donau (DE)

( * ) Notice: Subject to any disclaimer, the term of this patent is extended or adjusted under 35 U.S.C. 154(b) by 302 days.

(21) Appl. No.: 10/686,413

(22) Filed: Oct. 15, 2003

(65) Prior Publication Data

US 2004/0131722 A1  Jul. 8, 2004

(30) Foreign Application Priority Data

Oct. 15, 2002 (DE) ................ 102 48 071
May 13, 2003 (DE) ................ 103 21 355

(51) Int. Cl.
*B29C 45/23* (2006.01)
(52) U.S. Cl. .................................... 425/564
(58) Field of Classification Search ........... 425/549, 425/562–566
See application file for complete search history.

(56) References Cited

U.S. PATENT DOCUMENTS

| 3,912,133 | A |   | 10/1975 | Hehl |         |
|-----------|---|---|---------|------|---------|
| 4,010,903 | A | * | 3/1977  | Sakuri et al. ............... | 425/563 |
| 5,113,576 | A | * | 5/1992  | van Boekel et al. ........ | 425/549 |
| 6,358,039 | B1| * | 3/2002  | Manner et al. ............. | 425/564 |

FOREIGN PATENT DOCUMENTS

DE  2 336 099  2/1975

* cited by examiner

*Primary Examiner*—Tim Heitbrink
(74) *Attorney, Agent, or Firm*—Collard & Roe, P.C.

(57) ABSTRACT

An extrusion die for injecting plasticizable elastomers into a cavity of an injection-molding die, wherein the extrusion die is mounted on a cold-channel block which, for distribution of the material plasticized in a plasticization aggregate, is arranged between the aggregate and the injection-molding die. The extrusion die opening can be closed off with a needle that forms the extrusion-die-opening end of an insert that can be displaced in the extrusion die body and has a material transport channel. An external drive is provided for the displacement movement.

6 Claims, 1 Drawing Sheet

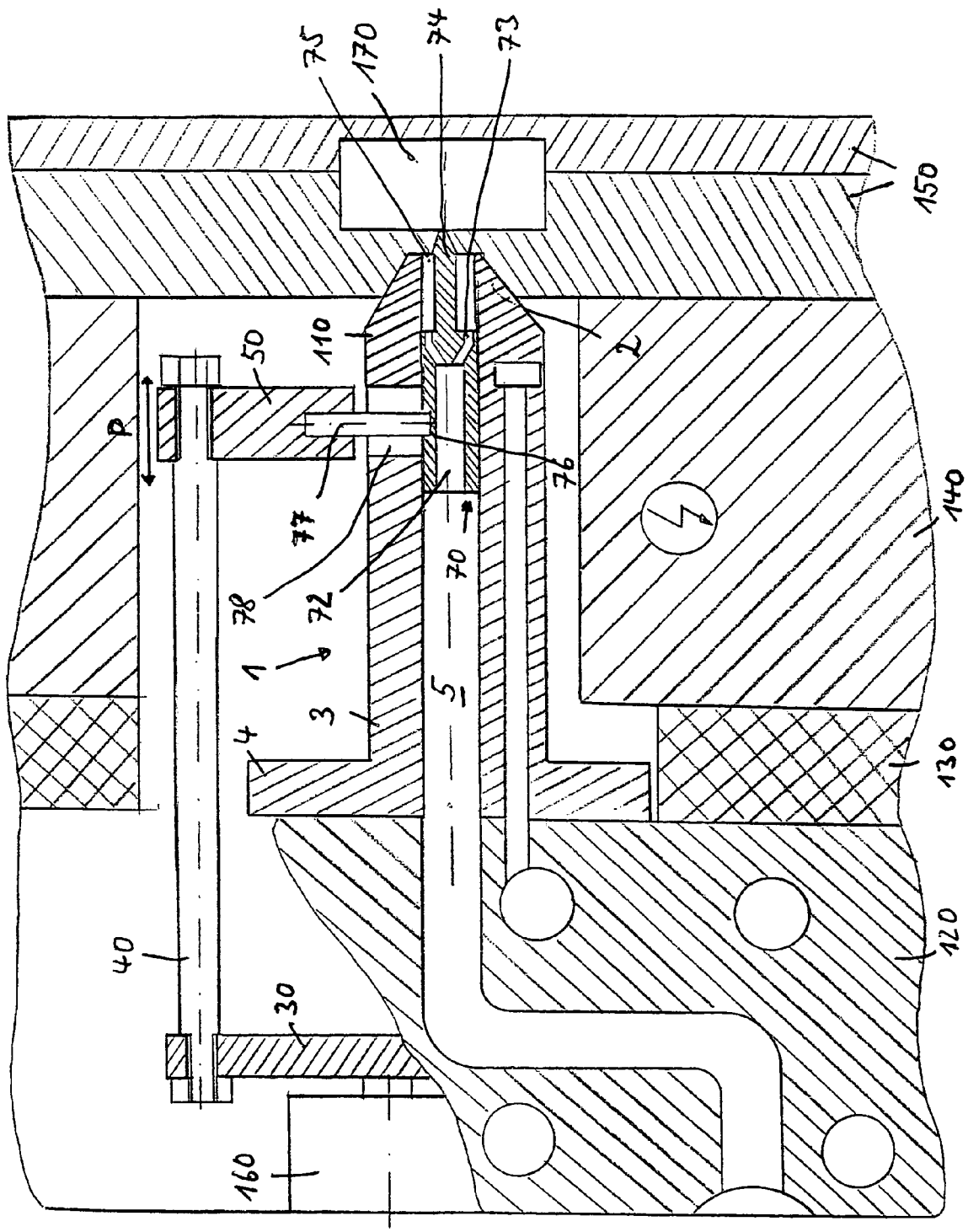

EXTRUSION DIE

BACKGROUND OF THE INVENTION

1. Field of the Invention

The invention relates to an extrusion die for injecting plasticizable elastomers into a cavity of an injection-molding die. The extrusion die is mounted on a cold-channel block which, for distribution of the material plasticized in a plasticization aggregate, is arranged between the aggregate and the injection-molding die.

The cold-channel block is therefore a distribution system that is supplied from a plasticization aggregate and impacts several of the extrusion dies in question by way of a channel system, which dies then inject the mass, still plastic, into corresponding mold cavities. In order for the plasticized mass not to already vulcanize on its way from the plasticization aggregate through the channel system to the extrusion dies, the cold channel block has a corresponding tempering system, in which a suitable tempering medium circulates.

2. The Prior Art

In the extrusion dies used until now, there was always a sprue that formed during the injection-molding process, which had to be removed from the injection-molding die after every shot, and resulted in an increased occurrence of waste.

SUMMARY OF THE INVENTION

It is therefore an object of the invention to provide an extrusion die wherein the injection-molding can take place without any sprue.

The invention comprises an extrusion die having an extrusion die opening that can be closed off with a needle, the needle being the extrusion-die-opening end of an insert that can be displaced in the extrusion die body and has the material transport channel. An external drive is provided for the displacement movement of the insert.

With the invention, activation of the closure needle and the material guidance are separated from one another. The insert that has the needle has flow through its inside. In the region of the material flow, no seals are used.

Furthermore, there is the advantage that no sprue waste occurs, since the work piece is directly injected with the extrusion die.

In an advantageous embodiment of the invention, the drive for the displacement movement of the insert that can be axially displaced in the extrusion die body is a short-stroke cylinder that is connected with a holder plate, by way of rods arranged outside of the extrusion die body. This plate surrounds the extrusion die body at the level of the insert and is mounted on the extrusion die body so that it can be displaced axially. Several bolts are arranged in the holder plate, radial to the center axis of the extrusion die, and project into a ring-shaped undercut in the insert with their ends that point radially inward.

To activate the short-stroke cylinder, the rods pull the holder plate and the insert, which is connected to the holder plate with a positive lock, back, thereby moving the needle out of the extrusion die opening to the back, making it possible to start the injection process. To close the extrusion die opening, the process takes place in the opposite direction.

The channel that conveys material ends, in the insert, in bores that empty out into the extrusion die mouth piece before the start of the needle region.

The insert and the needle form a structural unit, making it possible for the material guidance (through the insert) and the activation of the closure needle to be separated from one another.

The extrusion die opening is located in the extrusion die mouth piece which can be formed by a conically shaped threaded ring. This ring can be screwed onto the front end of the extrusion die body, so that in this state, a conical space is formed by the conical walls of the threaded ring, and on the back, by the front face of the insert. However, the extrusion die mouth piece can also be integrally formed with the extrusion die body.

The plasticized material from the cold channel first enters the channel in which the insert is guided so that it can be displaced, and from here into the insert itself, and through the bores in front of the needle into the space in the extrusion die mouth piece.

As already explained above, channels that carry tempering medium are provided in the cold-channel block, in order to prevent the vulcanization of plasticized material in the cold channel. In order for the material not to cure prematurely in the extrusion die, channels to carry a tempering medium are also provided in the extrusion die body, thereby allowing tempering of the extrusion die even into the front region of the extrusion die.

BRIEF DESCRIPTION OF THE DRAWING

Other objects and features of the present invention will become apparent from the following detailed description considered in connection with the accompanying drawing. It is to be understood, however, that the drawing is designed as an illustration only and not as a definition of the limits of the invention.

FIG. 1 shows an extrusion die according to the invention in cross-section.

DETAILED DESCRIPTION OF THE PREFERRED EMBODIMENT

Referring now in detail to the drawing, FIG. 1 shows an extrusion die 1 flanged onto a cold-channel block 120. Cold-channel block 120 is separated, by means of an insulation plate 130, from a heating plate 140, which in turn rests against a mold die 150. Extrusion die 1 is a so-called needle-closure extrusion die. Extrusion die 1 consists, in its essential parts, of an extrusion die mouth piece 2, an extrusion die body 3, and a mounting flange 4, which is mounted onto cold-channel block 120.

Extrusion die mouth piece 2 forms a conically structured, integral component 110 of extrusion die body 3. A continuous cylindrical channel 5 is provided in extrusion die body 3, in which channel an insert 70 is arranged so that it can be displaced axially, on the extrusion die mouth piece end. Insert 70 has a material-guiding channel that consists of a cylindrical region 72 that ends in openings 73 that empty from insert 70 into extrusion die mouth piece 2, specifically in the region in which insert 70 makes a transition into a closure needle 74 molded onto insert 70. Closure needle 74 closes off or releases the "Angus" opening of tool cavity 170. The extrusion die opening 75 has the same diameter as the channel 5. This simplifies the manufacture of the device. Due to the fact that the closure needle closes the sprue opening of the cavity 170, there is no sprue waste at the finished molded part.

In the region of cylindrical channel 72, a ring groove 76 is cut into the circumference of insert 70, into which bolts 77 reach, which are arranged radially in a holder ring 50. Holder ring 50 can be displaced on extrusion die body 3 in the axial direction, on a guide 78. For this purpose, holder ring 50 is connected with a holder plate 30, to which a short-stroke cylinder 160 is attached, by way of rods 40.

The plasticized material gets into extrusion die body 3, and from there into insert 70.

By activation of short-stroke cylinder 160, rods 40 pull holder plate 50, together with insert 70, to the back, thereby moving needle 74 out of extrusion die opening 75 and thereby allowing access by the plasticized material to mold cavity 170, by way of openings 73, extrusion die mouth piece 2, and extrusion die openings 75.

Accordingly, while only a few embodiments of the present invention have been shown and described it is obvious that many changes and modifications may be made thereunto without departing from the spirit and scope of the invention.

What is claimed is:

1. An extrusion die for injecting plasticizable elastomers into a cavity of an injection-molding die mounted on a cold-channel block which, for distribution of the material plasticized in a plasticization aggregate, is arranged between the aggregate and the injection-molding die, the extrusion die comprising:

an extrusion die body having an opening;

a needle for closing the opening of the extrusion die, said needle comprising an extrusion-die-opening end of an insert that is displaced in the extrusion die body and has a material transport channel; and an external drive for displacement movement of the insert comprising a short-stroke cylinder that is connected with a holder ring by way of rods arranged outside of the extrusion die body, said ring surrounding the extrusion die body at a level of the insert and being mounted on the extrusion die body so that said ring can be displaced axially, wherein several bolts are arranged in the holder ring, radial to a center axis of the extrusion die, and project into a ring-shaped undercut in the insert with their ends pointing radially inward.

2. An extrusion die according to claim 1, wherein the channel ends in the insert, are bores that empty out into an extrusion die mouth piece before a region of the needle starts.

3. An extrusion die according to claim 2, wherein the extrusion die mouth piece is formed by a conically shaped threaded ring, said ring adapted to be screwed onto the front end of the extrusion die body.

4. An extrusion die according to claim 2, wherein the extrusion die mouth piece is an integral part of the extrusion die body.

5. An extrusion die according to claim 1, further comprising channels to carry a tempering medium provided in the extrusion die body, to allow tempering of the extrusion die even into a front region of the extrusion die.

6. An extrusion die according to claim 1, wherein the extrusion die opening has a same diameter as the channel.

* * * * *